United States Patent
Fryer et al.

(10) Patent No.: US 10,834,440 B2
(45) Date of Patent: *Nov. 10, 2020

(54) SYSTEM AND METHOD FOR AUTOMATICALLY SELECTING ENCODING/DECODING FOR STREAMING MEDIA

(71) Applicant: AT&T Intellectual Property I, L.P., Atlanta, GA (US)

(72) Inventors: Todd Andrew Fryer, Liberty, MO (US); David Irvin, Baldwin City, KS (US); Nick Nicas, Blue Springs, CO (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,250

(22) Filed: Apr. 5, 2018

(65) Prior Publication Data

US 2018/0227606 A1    Aug. 9, 2018

Related U.S. Application Data

(63) Continuation of application No. 13/299,970, filed on Nov. 18, 2011, now Pat. No. 9,942,580.

(51) Int. Cl.
*H04N 21/2343* (2011.01)
*H04N 21/24* (2011.01)

(52) U.S. Cl.
CPC ..... *H04N 21/2343* (2013.01); *H04N 21/2402* (2013.01)

(58) Field of Classification Search
CPC .............. G06F 11/0787; G06F 11/106; G06F 11/1435; G06F 11/1451; G06F 12/0804; G06F 12/0871; G06F 12/12; G06F 12/128; G06F 2201/84; G06F 2212/604; G06F 2212/621; G06F 2212/70; G06F 15/16; H04N 5/2354; H04N 19/136; H04N 5/225;

(Continued)

(56) References Cited

U.S. PATENT DOCUMENTS 6,810,086 B1   10/2004   Puri et al.
6,909,745 B1   6/2005   Puri et al.

(Continued)

*Primary Examiner* — Dave Czekaj
*Assistant Examiner* — Kehinde Abimbola
(74) *Attorney, Agent, or Firm* — Amin, Turocy & Watson, LLP

(57) ABSTRACT

Disclosed herein are systems, methods, and non-transitory computer-readable storage media for encoding media content based on network quality of service parameters. A system configured to practice the method determines quality of service parameters for a network between a media server and a media client. The system selects an encoder based on a list of decoders available at the media client and the quality of service parameters, and encodes at least a portion of the media via the encoder. The system can further determine settings for the encoder based on a media type, and encode the media via the encoder according to the settings. The system can detect when the media client moves to a new network, detect new quality of service parameters, and select a new encoder based on the list of decoders available at the media client, the media type, and the new quality of service parameters.

20 Claims, 4 Drawing Sheets

(58) Field of Classification Search
CPC .... H04N 5/2256; H04N 5/228; H04N 5/4401; H04N 7/108; H04N 7/183; H04N 5/4446; H04N 21/235; H04N 21/2543; H04N 7/088; H04N 9/045; H04N 9/735; H04N 19/119

See application file for complete search history.

(56) References Cited

U.S. PATENT DOCUMENTS

| | | | |
|---|---|---|---|
| 6,968,006 B1 | 11/2005 | Puri et al. | |
| 6,970,513 B1 | 11/2005 | Puri et al. | |
| 7,039,116 B1 * | 5/2006 | Zhang | H04N 21/2402 348/441 |
| 7,277,485 B1 | 10/2007 | Puri et al. | |
| 7,630,444 B1 | 12/2009 | Puri et al. | |
| 7,715,475 B1 | 5/2010 | Puri et al. | |
| 7,773,670 B1 | 8/2010 | Puri et al. | |
| 8,412,842 B2 | 4/2013 | Andersson | |
| 9,009,066 B2 * | 4/2015 | Long | G06Q 30/02 705/14.68 |
| 9,077,853 B2 | 7/2015 | Civanlar | |
| 9,143,825 B2 | 9/2015 | Chittella | |
| 2002/0080871 A1 | 6/2002 | Fallon et al. | |
| 2003/0119515 A1 | 6/2003 | Holler et al. | |
| 2003/0191876 A1 | 10/2003 | Fallon | |
| 2005/0047449 A1 | 3/2005 | Adolph et al. | |
| 2005/0125838 A1 * | 6/2005 | Wang | H04N 7/17318 725/109 |
| 2006/0025149 A1 | 2/2006 | Karaoguz | |
| 2006/0146703 A1 | 7/2006 | Cha et al. | |
| 2006/0227870 A1 * | 10/2006 | Tian | G06T 9/00 375/240.03 |
| 2007/0022032 A1 | 1/2007 | Anderson | |
| 2007/0067704 A1 * | 3/2007 | Altintas | H03M 13/27 714/795 |
| 2007/0109156 A1 | 5/2007 | Fallon | |
| 2007/0171841 A1 | 7/2007 | Witzel | |
| 2007/0174209 A1 | 7/2007 | Fallon et al. | |
| 2007/0230563 A1 * | 10/2007 | Tian | H04N 7/0127 375/240.01 |
| 2008/0118227 A1 | 5/2008 | Barton | |
| 2009/0006104 A1 | 1/2009 | Sung et al. | |
| 2009/0052553 A1 * | 2/2009 | Van Caenegem | H04N 19/895 375/240.27 |
| 2009/0138614 A1 | 5/2009 | Tayloe et al. | |
| 2009/0216897 A1 | 8/2009 | Wang | |
| 2009/0295905 A1 | 12/2009 | Civanlar | |
| 2010/0054344 A1 | 3/2010 | Puri et al. | |
| 2010/0205049 A1 * | 8/2010 | Long | G06Q 30/02 705/14.5 |
| 2010/0248643 A1 | 9/2010 | Aaron | |
| 2010/0272173 A1 | 10/2010 | Puri et al. | |
| 2010/0316066 A1 | 12/2010 | Leung | |
| 2011/0164111 A1 | 7/2011 | Karaoguz | |
| 2011/0302324 A1 | 12/2011 | Karaoguz | |
| 2012/0023522 A1 | 1/2012 | Anderson | |
| 2012/0050616 A1 | 3/2012 | Andersson | |
| 2012/0059872 A1 * | 3/2012 | Chen | H04L 65/4084 709/203 |
| 2012/0131627 A1 | 5/2012 | Chittella | |
| 2012/0213294 A1 | 8/2012 | Hobgood et al. | |
| 2012/0239921 A1 | 9/2012 | Fallon | |
| 2012/0242775 A1 * | 9/2012 | Lin | H04N 7/147 348/14.03 |
| 2013/0034146 A1 | 2/2013 | Jeong | |

* cited by examiner

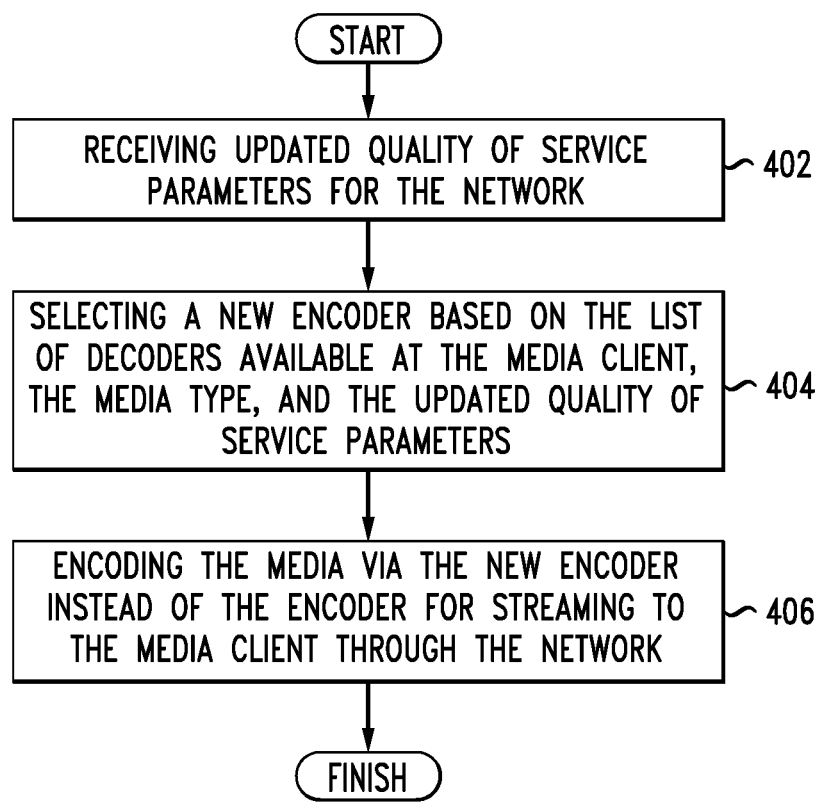

SYSTEM AND METHOD FOR AUTOMATICALLY SELECTING ENCODING/DECODING FOR STREAMING MEDIA

PRIORITY INFORMATION

The present application is a continuation of U.S. patent application Ser. No. 13/299,970, filed Nov. 18, 2011, the content of which is incorporated herein by reference in its entirety.

BACKGROUND

1. Technical Field

The present disclosure relates to media delivery and more specifically to optimizing media encoder selection based on network conditions.

2. Introduction

Many variables come in to play when streaming media, particularly video media, over a network from a media source to a media playback client. One main variable is network quality, which is, in fact, a collection of different variables. For example, inconsistent bit rates, jitter, latency, packets arriving out of order, and other Quality of Service parameters can wreak havoc on the client's ability to play back media in a high quality, smooth, pleasing manner.

In existing media streaming approaches, a media provider uses a media encoder corresponding to a media decoder at a client. The media provider and the client negotiate, such as in a handshake, to determine approximate network conditions and an expected baseline of network quality. If the network conditions change (i.e. deteriorate or improve), the media provider changes parameters of the encoder to respond to the changes, such as lowering the bitrate of the media streamed from the media provider to the client. These changed parameters can negatively impact the video playback quality at the client, introducing video compression artifacts. Further, network conditions can degrade so far that the client is unable to display any meaningful image. As more and larger types of media are streamed over packet-switched networks, such as streaming HDTV broadcasts, these problems become more pronounced.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approach set forth herein is for automating encoder/decoder selection based on Quality of Service to provide optimal video quality for streaming content. Instead of relying solely on changing streaming parameters of an encoder, this approach handles changing network conditions by changing from one encoder to another, based on conditions such as the network quality of service, type of network, type of media to stream, client preferences, decoders available on the client, and so forth. An encoder and a corresponding decoder can be matched 'pair' of a coder/decoder, or codec. The system changes the source media encoder by utilizing an automated selectable multi-codec module that checks the transmission medium Quality of Service, including parameter such as throughput, latency, buffer, propagation error, jitter, and so forth. Based on the input media type format, the system compares the input media type to a list of available decoders at the client, and begins automatically encoding the media using an optimal codec based on those parameters. The client device can receive metadata associated with the received encoded stream to command the client device to automatically apply a particular decoder from a store of available decoders. Alternatively, the client device can simply identify an encoding type of the received encoded stream without the use of metadata, then select and apply the appropriate decoder.

Disclosed are systems, methods, and non-transitory computer-readable storage media for a media server and for a media client. The media server determines quality of service parameters for a network between the media server and a media client. The quality of service parameters can include throughput, latency, buffer, propagation, error, jitter, and other network metrics. The quality of service parameters can be determined based on information gathered by at least one of the media server, the media client, and a node residing in the network.

The media server selects an encoder based on a list of decoders available at the media client and the quality of service parameters, and encodes at least a portion of the media via the encoder for streaming to the media client. The media server can select the encoder based on a ratio of encoder compression output quality to source media quality. The list of decoders can be received from the media client or from a database lookup, such as a media client device type database indicating which decoders are available for a particular media client software and/or hardware revision. Further, the list can indicate whether the decoders are hardware decoders or software decoders. The media server can also determine a media profile for media to be transmitted to the media client, and select the encoder further based on the media profile. The media server can determine settings for the encoder based on the media type and the quality of service parameters, and encode the media via the encoder according to the settings.

In the case of streaming media to a mobile device or other device that can change between networks, the media server can detect that the media client has moved to a new network, receive new quality of service parameters for the new network, select a new encoder based on the list of decoders available at the media client, the media type, and the new quality of service parameters, and encode the media via the new encoder instead of the encoder for streaming to the media client through the new network. Similarly, the media server can receive updated quality of service parameters for the network, select a new encoder based on the list of decoders available at the media client, the media type, and the updated quality of service parameters, and encode the media via the new encoder instead of the encoder for streaming to the media client through the network.

The media server can determine an optimal encoder based on the media type and the quality of service parameters, but for which a decoder corresponding to the optimal encoder is not on the list of decoders available at the media client. In this case, the media server can select a temporary encoder based on the list of decoders available at the media client, and encode the media via the temporary encoder for streaming to the media client. Then the media server can instruct the media client to obtain the decoder, such as from the media server or from some other source. Upon receiving a notification that the media client has obtained the decoder, the media server can encode the media via the optimal encoder instead of the temporary encoder for streaming to the media client.

A media client can optionally report a set of available decoders to a media server or other entity. The media client requests media from the media server, which selects an encoder based on a type of the media, network quality of service parameters, and the set of decoders. Then the media client receives from the media server a stream of the media, and decodes the stream using a decoder, from the set of decoders, corresponding to the encoder to yield decoded media data. The media client outputs the decoded media data, such as on a display. The media client can detect a move to a new network, and report the new network to the media server. The media client can transmit to the media server client parameters for video playback associated with at least one of processor usage, memory usage, battery usage, bandwidth, visual quality, client output capabilities, availability of dedicated decoding hardware, decoder capabilities, licensing, and cost. The media server can receive the client parameters, and select an encoder further based on the client parameters.

In this way, the media server and the media client can adapt to different network conditions by selecting a different encoder/decoder pair that is based on specific network conditions, and can even switch encoder/decoder midstream. Thus, the media server and media client are not limited to the capabilities of any single encoder/decoder, and can better adapt to provide the best media experience possible, given the network and quality of service conditions.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improving and maintaining quality in streamed media. A brief introductory description of a basic general purpose system or computing device in FIG. 1 which can be employed to practice the concepts is disclosed herein. A more detailed description of media streaming using encoders and decoders selected based on network quality information will then follow. These variations shall be discussed herein as the various embodiments are set forth. The disclosure now turns to FIG. 1.

Figure 1:
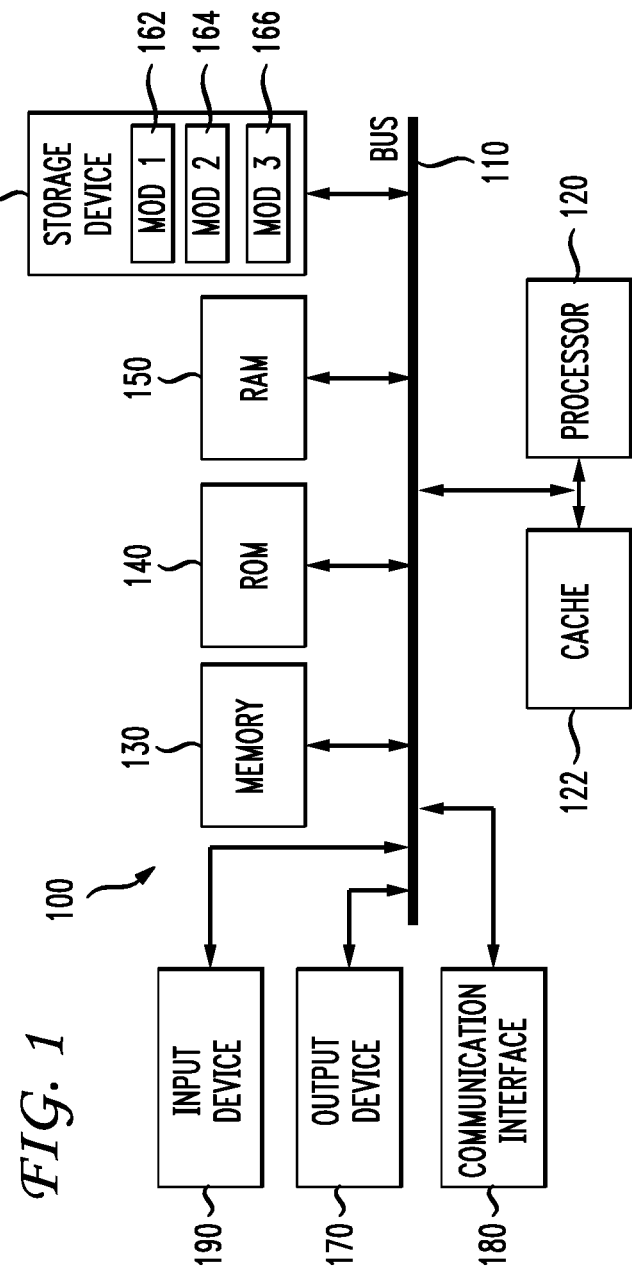
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of media streaming. This approach automatically selects the optimal encoding/decoding/transcoding platform for uncompressed or previously encoded streaming media. The system intelligently processes data collected via received input signals from the connected device, the media to be encoded for streaming (including type and/or format), and input from the connected transmission path that describes Quality of Service via TX/RX monitoring. The system can determine an optimal codec based on data collected from the sources and transmission path for the media to be streamed. Once the codec at the system is selected, the system begins streaming the media and processing metadata for causing the proper decoder selection at the media client device. This approach is unique because it strays from the conventional approaches of focusing on the transmission medium throughput as the selection for encoding compression level. This approach automatically selects an entire codec based on link quality of service and input media type. This approach allows for a streaming media end user to receive the absolute best quality content based off the various codecs and their compression ratio to source quality.

Figure 2:
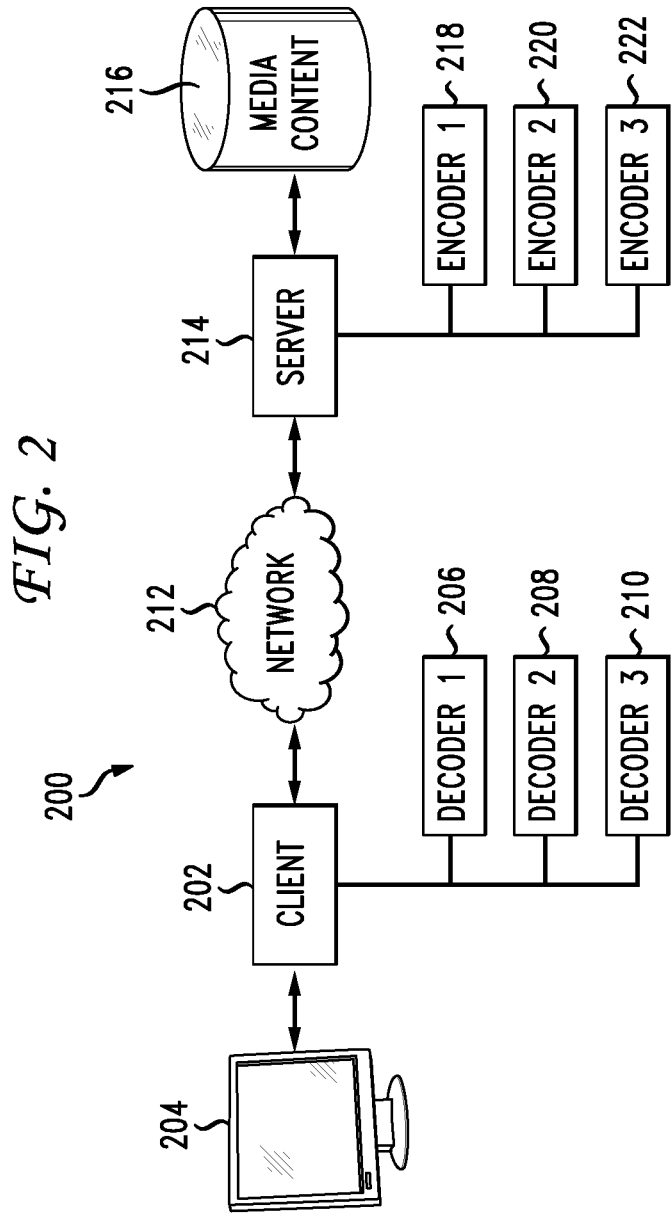
FIG. 2 illustrates an example media streaming architecture.

FIG. 2 illustrates an example media streaming architecture 200. In this architecture 200, a media server 214 streams media content 216 over a network 212 to a media client 202 for output on a display 204. The server 214 has a set of encoders 218, 220, 222 which it can use to encode media content 216. The encoders can be dedicated encoders or can be part of a codec package. The client 202 also has decoders 206, 208, 210 which it uses to decode encoded streamed media content for playback. The client 202 can be a mobile device such as a smartphone, laptop computer, or tablet, a non-mobile device, such as a cable or digital television set-top box, or other device. The client 202 makes a request to the server 214, via the network 212, for media content 216. The client 202 and the server 214 can perform a handshake to allow the server 214 to identify which decoders 206, 208, 210 the client 202 has available. The server 214 can explicitly query the types of decoders available, or can request other information from which the server 214 can infer which types of decoders are available, such as a network address, a client device type, a client software platform and/or revision, and so forth. The server 214 can use a database of available decoders for different types of devices, for example, to determine that a device of type X has decoders Y and Z available. In another example, the server 214 has a database of available decoders for potential clients, and when a media content request arrives from a particular network address, the server 214 can look up that network address in the database to determine which decoders are available at that client. The database can be updated as clients add decoders, or as clients are added or removed.

The server 214 also receives network quality of service information for the network 212. In one variation, the client 202 sends a quality of service 'burp', which stands for Bi-directional Universal Rate Ping, to the server 214 from which the server can determine at least some of the network quality of service information. The serve 214 and/or the client 202 can determine and communicate the network quality of service information in other ways as well, either singly or in cooperation one with another. Based on the network quality of service information, the server 214 identifies an optimal encoder from a set of encoders having corresponding decoders on the client 202. For example, if the network quality of service information indicates particularly low throughput, such as 1.5 megabit per second, the server 214 can select an MPEG-4 encoder because MPEG-4 can handle very low bandwidth connections and still present decent video quality. On the other hand, if the network quality of service information indicates that the network has very low latency and high throughput, such as 10 megabits per second, the server 214 can select a VC-1 encoder because it can provide high-quality video at that bit rate.

The server 214 can gauge or detect network quality of service information in other ways as a replacement for or as a supplement to the quality of service burp. For example, the server 214 can perform its own network testing, or nodes in the network can report current network conditions to the server 214. If the server 214 receives data from multiple sources, the server 214 can intelligently combine that data to construct an accurate reflection of network conditions.

Further, the client 202 can send to the server 214 user or device preferences for a particular decoder, a particular encoder setting, and/or a particular goal. For example, if the client 202 has a software decoder and a hardware decoder, the hardware decoder may be less taxing on the battery life of the client 202. Thus, in low-battery situations, the client 202 can send a preference to the server 214 for using the hardware decoder, even if the corresponding encoder on the server 214 may not be the optimal encoder given the network conditions. The preference can also include a preference strength or weight. For example, if the video quality using preferred hardware decoder, given the network conditions, is below a certain threshold indicated by the preference strength, then the server can use an encoder corresponding to the software encoder instead. In this way, the client 202 can indicate a preference, and use the preference strength as a way to indicate how and when to make a trade-off between video quality and battery life or other client consideration. Similarly, the client 202 may be using or planning to use some of the network resources for a background task, such as downloading a software update or uploading data to a social network. In this case, the client 202 can request that the settings for the selected encoder use a lower bit rate, either based on an absolute reduction in bit rate or a dynamic reduction in bit rate or other setting.

Then, once the server 214 has selected a codec and appropriate settings for that codec, the server 214 progressively encodes portions of the media content 216 in real time for streaming to the client 202. The client 202 receives the encoded media content, decodes the encoded media content using the corresponding decoder, and outputs the decoded content on the display 204.

If the server 214 or the client 202 detects a change in the network quality of service information, the server 214 can select a new encoder and/or new settings for streaming the media content if the previously selected encoder and/or settings are no longer optimal. The client 202 can send periodic burps to the server 214 indicating the quality of service, such as every 50 milliseconds or some other interval. Alternately, the client 202 can send a burp or other signal to the server 214 when network conditions change beyond a threshold, or when the client 202 changes from one network to another, such as a mobile device switching from a Wi-Fi network to a 3G cellular network. In these cases, the server 214 can switch from one encoder to another encoder mid-stream to continue to provide optimal video quality given the network conditions.

Figure 3:
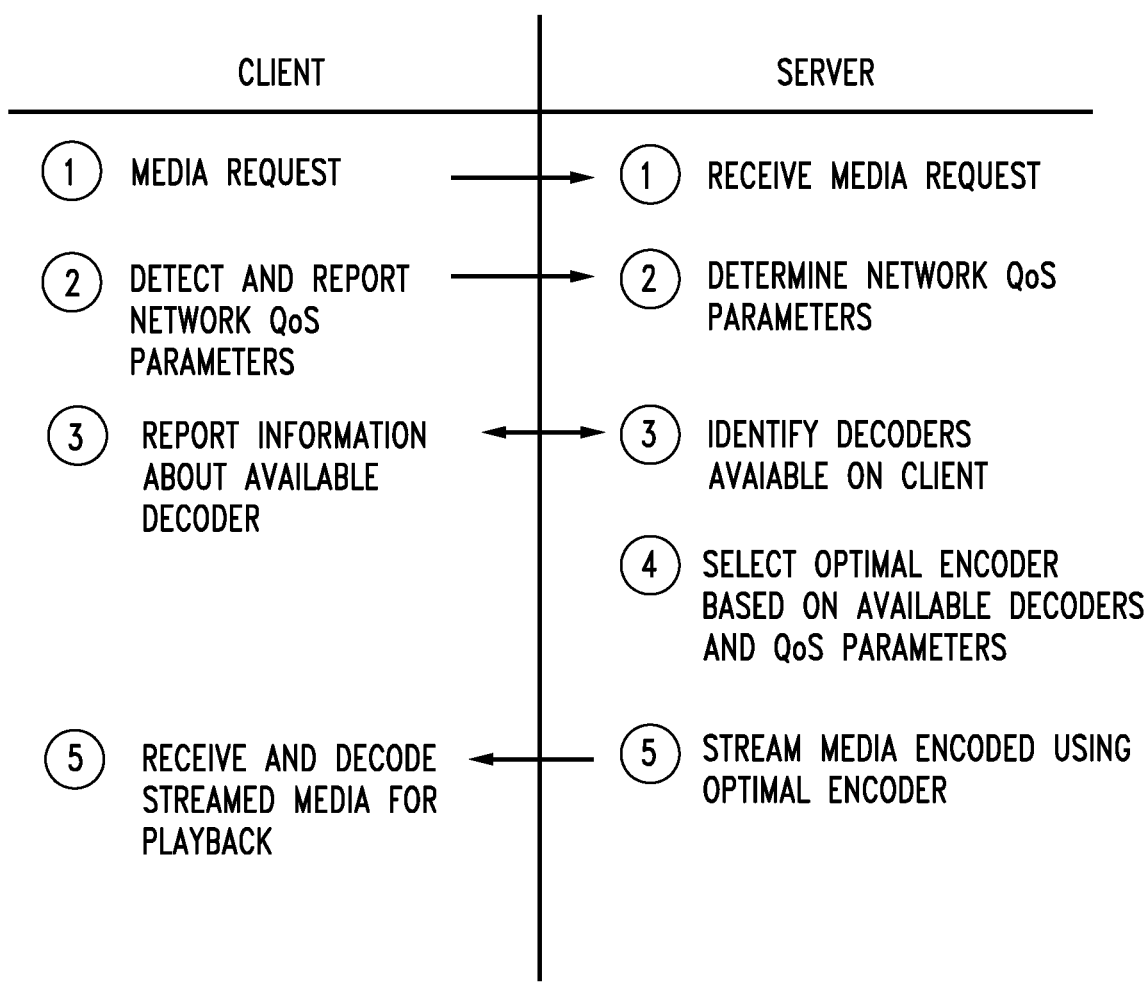
FIG. 3 illustrates an exemplary set of steps representing interactions between a media playback client and a media streaming server.

FIG. 3 illustrates an exemplary set of steps representing interactions between a media playback client and a media streaming server. First, the media playback client sends a media request to the media streaming server, which the media streaming server receives. Second, the media playback client detects and reports network quality of service parameters, and/or the media streaming server determines network quality of service parameters. The media streaming server can combine and analyze data, which may or may not overlap, from multiple sources to determine as complete of a picture of network conditions as possible. Third, the media playback client can report information about available decoders on the media playback client. This step can occur at any point, including before the media request. Further, other entities besides the media playback client can report information about which decoders are available on the media playback client, such as an available decoder database service, or a look-up table of available decoders by device type. Fourth, the media streaming server selects an optimal encoder and/or optimal settings for the encoder based on the available decoders on the media playback client, and the network quality of service parameters. The media streaming server can use a logic table, parameter ranges, algorithms, and/or preconfigured settings, for example, to determine which encoder and which settings are 'optimal', and what 'optimal' means. Optimal can be directed to absolute video quality, video quality given the output capabilities of the media playback client, monetarily cheapest to encode and transmit, computationally cheapest to encode and transmit, the maximum quality that can fit within a certain cost and/or bandwidth, which encoders require a license fee, and other factors.

The factors that determine an optimal encoder and settings can be established for all clients, or clients/users can establish personalized factors and weights for those factors that take in to consideration what a user desires. For example, one user may have an extremely high end audio system, so his preferences can indicate to only use lossless audio encoding in 7.1 surround sound for video content. Another user may use the built-in speakers in his HDTV, so his preferences can indicate to down-mix all the audio to stereo and to permit the use of lossy encoding. Further, these settings can be established per user and/or per device, to accommodate for user-specific preferences and device-specific abilities and considerations.

Similarly, the media streaming server can select encoders based on different ranges of network quality parameters that are suited to different encoders. For example, codec X may apply to a certain high bandwidth and low jitter range, with various parameter changes based on the actual bandwidth available and the actual jitter experienced. If the bandwidth or jitter drops below a certain threshold into a different range of parameters, the system can switch to a different encoder corresponding to that different range. Further, the system can consider the current encoding of the source media content. If the source media content is already encoded using a non-optimal encoder, such as the second choice of encoder based on the network parameters, then the system can determine that the extra effort, cost, and computing time to transcode using the optimal encoder would outweigh the incremental improvement in quality over the existing encoded media. In this case, the media streaming server can simply transmit the previously encoded media, as long as the media playback client has a corresponding decoder.

Fifth, the media streaming server streams encoded media using the optimal encoder and the optimal settings in response to the media request, and the media playback client receives and decodes the streamed media for playback. The media streaming server can encode or transcode media content. The principles set forth herein allow streaming media to retain its pre-encoded source quality (for native content) and to be transported greater distances with lower bit rate technologies, such as 3G cellular networks, 4G or LTE cellular networks, and/or locally available wireless networks.

Having disclosed some basic system components and concepts, the disclosure now turns to the exemplary method embodiment shown in FIG. 4. For the sake of clarity, the method is discussed in terms of an exemplary system 100 as shown in FIG. 1 configured to practice the method as the media server. The steps outlined herein are exemplary and can be implemented in any combination thereof, including combinations that exclude, add, or modify certain steps.

The media server determines quality of service parameters for a network between the media server and a media client (402). The quality of service parameters can include throughput, latency, buffer, propagation, error, jitter, and other network metrics. The quality of service parameters can be determined based on information gathered by at least one of the media server, the media client, and a node residing in the network.

The media server selects an encoder based on a list of decoders available at the media client and the quality of service parameters (404), and encodes at least a portion of the media via the encoder for streaming to the media client (406). The media server can select the encoder based on a ratio of encoder compression output quality to source media quality. The list of decoders can be received from the media client or from a database lookup, such as a media client device type database indicating which decoders are available for a particular media client software and/or hardware revision. Further, the list can indicate whether the decoders are hardware decoders or software decoders. The media server can also determine a media profile for media to be transmitted to the media client, and select the encoder further based on the media profile. The media server can determine settings for the encoder based on the media type and the quality of service parameters, and encode the media via the encoder according to the settings.

In the case of streaming media to a mobile device or other device that can change between networks, the media server can detect that the media client has moved to a new network, receive new quality of service parameters for the new network, select a new encoder based on the list of decoders available at the media client, the media type, and the new quality of service parameters, and encode the media via the new encoder instead of the encoder for streaming to the media client through the new network. Similarly, the media server can receive updated quality of service parameters for the network, select a new encoder based on the list of decoders available at the media client, the media type, and the updated quality of service parameters, and encode the media via the new encoder instead of the encoder for streaming to the media client through the network.

The media server can determine an optimal encoder based on the media type and the quality of service parameters, but for which a decoder corresponding to the optimal encoder is not on the list of decoders available at the media client. In this case, the media server can select a temporary encoder based on the list of decoders available at the media client, and encode the media via the temporary encoder for streaming to the media client. Then the media server can instruct the media client to obtain the decoder, such as from the media server or from some other source. Upon receiving a notification that the media client has obtained the decoder, the media server can encode the media via the optimal encoder instead of the temporary encoder for streaming to the media client.

On the other hand, the media client can optionally report a set of available decoders to a media server or other entity. The media client requests media from the media server, which selects an encoder based on a type of the media, network quality of service parameters, and the set of decoders. Then the media client receives from the media server a stream of the media, and decodes the stream using a decoder, from the set of decoders, corresponding to the encoder to yield decoded media data. The media client outputs the decoded media data, such as on a display. The media client can detect a move to a new network, and report the new network to the media server. The media client can transmit to the media server client parameters for video playback associated with at least one of processor usage, memory usage, battery usage, bandwidth, visual quality, client device output capabilities, availability of dedicated decoding hardware, decoder capabilities, licensing, and cost. The media server can receive the client parameters, and select an encoder further based on the client parameters.

In this way, the media server and the media client can adapt to different network conditions by selecting a different encoder/decoder pair that is based on specific network conditions, and can even switch encoder/decoder midstream. Thus, the media server and media client are not limited to the capabilities of any single encoder/decoder, and can better adapt to provide the best media experience possible, given the network and quality of service conditions.

In some variations of this approach, the media server can identify an optimal encoder which is not available on the client, and a second encoder which is available on the client. In this case, the media server can progressively encode the media for streaming to the client for playback, while a decoder corresponding to the optimal encoder is being transmitted to the client. The media server or other entity can provide the decoder to the client. Alternatively, the media server or other entity can provide a link to the client a link to download the decoder, or other instructions to obtain the decoder. Then, upon receiving a signal that the client has the optimal decoder in place, the media server can transition to the optimal encoder seamlessly. This example assumes that the client stores decoders in some kind of storage medium which can be updated to include new decoders. Similarly, the client can download and install new firmware for a hardware decoder, or a user can install a removable device storing a decoder, such as a USB memory device or other device having an integrated hardware decoder.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving, over a network, from a media server and at a media client, a first portion of a media, wherein the media was encoded with a first encoder on the media server, wherein a selection of the first encoder is based on a first decoder available on the media client, the first decoder corresponding to the first encoder, and wherein the selection of the first encoder is further based on quality of service parameters;
   receiving, over the network and at the media client, a second portion of the media, the second portion of the media being encoded with a temporary encoder when a second decoder is not available at the media client associated with a second encoder which is identified as preferable for encoding the second portion;
   obtaining the second decoder; and
   after obtaining the second decoder, receiving a third portion of the media that is encoded using the second encoder.

2. The method of claim 1, wherein the media server determines settings for one or more of the first encoder, the second encoder and the temporary encoder based on a type of the media and the quality of service parameters.

3. The method of claim 2, wherein the media server encodes at least one portion of the media via one or more of the first encoder, the second encoder and the temporary encoder according to the settings.

4. The method of claim 1, further comprising:
   transmitting new quality of service parameters to the media server when the media client moves to a new network, wherein the media server selects a new encoder based on one or more of a list of decoders available at the media client, a media type, a battery life, and the new quality of service parameters.

5. The method of claim 4, wherein the media server encodes at least a portion of the media via the new encoder for streaming to the media client through the new network.

6. The method of claim 1, further comprising:
   transmitting updated quality of service parameters for the network to the media server, wherein the media server selects a new encoder based on one or more of a list of decoders available at the media client, a media type, a battery life, and the updated quality of service parameters and encodes at least a portion of the media via the new encoder for streaming to the media client through the network.

7. The method of claim 1, further comprising:
   transmitting client parameters to the media server, wherein the media server selects an encoder further based at least in part on the client parameters.

8. The method of claim 7, wherein the client parameters are associated with one or more of processor usage, memory usage, bandwidth, visual quality, client output capabilities, availability of dedicated decoding hardware, decoder capabilities, licensing, and cost.

9. The method of claim 1, wherein the quality of service parameters comprise one or more of throughput, latency, buffer, propagation, error, and jitter.

10. A system comprising:
    a processor; and
    a computer-readable storage medium having instructions stored which, when executed by the processor, cause the processor to perform operations comprising:
      receiving, over a network, from a media server and at a media client, a first portion of a media, wherein the media was encoded with a first encoder on the media server, wherein a selection of the first encoder is based on a first decoder available on the media client, the first decoder corresponding to the first encoder, and wherein the selection of the first encoder is further based on quality of service parameters;
      receiving, over the network and at the media client, a second portion of the media, the second portion of the media being encoded with a temporary encoder when a second decoder is not available at the media client associated with a second encoder which is identified as preferable for encoding the second portion;
      obtaining the second decoder; and
      after obtaining the second decoder, receiving a third portion of the media that is encoded using the second encoder.

11. The system of claim 10, wherein the media server determines settings for one or more of the first encoder, the second encoder and the temporary encoder based on a type of the media and the quality of service parameters.

12. The system of claim 11, wherein the media server encodes at least one portion of the media via one or more of the first encoder, the second encoder and the temporary encoder according to the settings.

13. The system of claim 10, wherein the computer-readable storage medium stores additional instructions which, when executed by the processor, cause the processor to perform operations further comprising:
transmitting new quality of service parameters to the media server when the media client moves to a new network, wherein the media server selects a new encoder based on one or more of a list of decoders available at the media client, a media type, a battery life, and the new quality of service parameters.

14. The system of claim 13, wherein the media server encodes at least a portion of the media via the new encoder for streaming to the media client through the new network.

15. The system of claim 10, wherein the computer-readable storage medium stores additional instructions which, when executed by the processor, cause the processor to perform operations further comprising:
transmitting updated quality of service parameters for the network to the media server, wherein the media server selects a new encoder based on one or more of a list of decoders available at the media client, a media type, a battery life, and the updated quality of service parameters and encodes at least a portion of the media via the new encoder for streaming to the media client through the network.

16. The system of claim 10, wherein the computer-readable storage medium stores additional instructions which, when executed by the processor, cause the processor to perform operations further comprising:
transmitting client parameters to the media server, wherein the media server selects an encoder further based on the client parameters.

17. The system of claim 16, wherein the client parameters are associated with one or more of processor usage, memory usage, bandwidth, visual quality, client output capabilities, availability of dedicated decoding hardware, decoder capabilities, licensing, and cost.

18. The system of claim 10, wherein the quality of service parameters comprise one of throughput, latency, buffer, propagation, error, and jitter.

19. A non-transitory computer-readable storage device having instructions stored which, when executed by a computing device, cause the computing device to perform operations comprising:
receiving, over a network, from a media server and at a media client, a first portion of a media, wherein the media was encoded with a first encoder on the media server, wherein a selection of the first encoder is based on a first decoder available on the media client, the first decoder corresponding to the first encoder, and wherein the selection of the first encoder is further based on quality of service parameters;
receiving, over the network and at the media client, a second portion of the media, the second portion of the media being encoded with a temporary encoder when a second decoder is not available at the media client associated with a second encoder which is identified as preferable for encoding the second portion;
obtaining the second decoder; and
after obtaining the second decoder, receiving a third portion of the media that is encoded using the second encoder.

20. The non-transitory computer-readable storage device of claim 19, wherein the media server determines settings for one or more of the first encoder, the second encoder and the temporary encoder based on a type of the media and the quality of service parameters.

* * * * *